Figure 1:
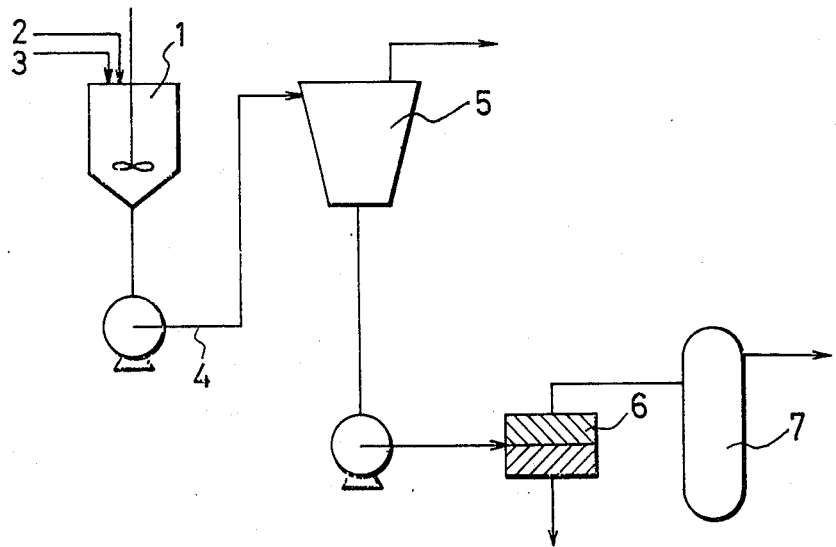

United States Patent [19]
Harada et al.

[11] 3,887,537
[45] June 3, 1975

[54] PROCESS FOR RECOVERING FATTY ACIDS AND/OR ROSIN ACIDS
[75] Inventors: Tetsuya Harada, Tokyo; Tsunemasa Yumoto, Yokohama, both of Japan
[73] Assignee: Japan Synthetic Rubber Company Limited, Japan
[22] Filed: Sept. 6, 1974
[21] Appl. No.: 503,873

[30] Foreign Application Priority Data
Sept. 18, 1973  Japan.............................. 48-105258

[52] U.S. Cl............................. 260/97.6; 260/397.25
[51] Int. Cl. ............................................... C09f 8/07
[58] Field of Search....................... 260/97.6, 397.25

[56] References Cited
OTHER PUBLICATIONS
"Encyclopedia of Chemical Technology", 1953.

Primary Examiner—M. J. Welsh
Assistant Examiner—William E. Parker
Attorney, Agent, or Firm—Toren, McGeady and Stanger

[57] ABSTRACT

A process for recovering fatty acids and/or rosin acids which comprises the steps of saponifying a tall oil head and/or pitch, introducing the saponified material into a thin film evaporator equipped with a rake and having a clearance of not more than one millimeter between the blade tips and the surrounding tube wall, evaporating and removing the low-boiling matter including unsaponifiables by a treatment at a temperature not lower than the melting point of the resulting soaps, and thereafter decomposing the saponification products.

4 Claims, 2 Drawing Figures

PROCESS FOR RECOVERING FATTY ACIDS AND/OR ROSIN ACIDS

This invention relates to a process for recovering fatty acids and/or rosin acids, and more specifically to a process for recovering such acids with high degrees of purity from the fatty-acid fraction (hereinafter called the "head") containing much unsaponifiable matter and the fatty acid-rosin acid fraction (hereinafter called the "pitch") having large contents of unsaponifiables, fatty acids, rosin acids, sterols, and esters, which are obtained as secondary products in the distillation for refining of tall oil.

Tall oil contains rosin acids, fatty acids, esters, and unsaponifiables. According to the known industrial processes, these useful components are recovered in the following way. At first, tall oil is distilled for removing the head composed mainly of water and unsaponifiable materials lighter than fatty acids. Next, the pitch mostly made up of esters and unsaponifiables heavier than rosin acids is taken away. The distillate is separated into rosin acids and crude fatty acids and recover the rosin acids as product. To attain sufficient purity for industrial uses, the crude fatty acids are further distilled for removing the head as an unsaponifiable fraction containing much fatty acids, and high purity fatty acids are thus obtained.

When rosin acids and fatty acids with sufficient purity for the industrial purposes are to be obtained from tall oil by distillation, it has been necessary, as noted above, to remove unsaponifiable matter and esters from the tall oil. Because the boiling points of the unsaponifiables are very close to those of rosin acids or fatty acids, the head on its way of removal carries away some percentages of fatty acids and, likewise, the pitch carries away some percentages of rosin acids, thus leading to substantial losses of such industrially valuable acids. Methods of recovering industrially useful components from the pitch are known in the art, for example, from U.S. Pat. Nos. 2,394,615, 2,610,195, 2,248,346, and 2,275,075. According to those methods, tall oil or tall oil pitch is saponified, the unsaponifiable matter is extracted from the resultant soaps by the use of a solvent in which the soaps are little soluble, and the many steps of refining is repeated to obtain β-sitosterol from the unsaponifiables. The methods of separating and recovering useful components with the aid of a solvent require a variety of physical treatments and a number of steps, in addition to the necessity of recovering the solvent used. These requirements make the recovery plant highly complex and uneconomical. Moreover, the soaps thereby produced are rather impure because of the unsaponifiable matter and the solvent present therein. The fact that the soaps dissolve in the solvent brings down the recovery rate of the soaps to a very low level. Further, when extracting the unsaponifiables by soaping, emulsification will take place, making the interfacial separation extremely difficult.

It is a primary object of the present invention to provide a process for recovering high purity fatty acids and rosin acids in a simple way from a fraction or fractions of tall oil distilled, viz., from the head and/or the pitch.

Another object of the invention is to provide a process for recovering high purity fatty acids and rosin acids in high yields and also recovering industrially valuable unsaponifiable matter such as sterols, by saponifying the head and/or the pitch with an aqueous alkali solution to soaps and unsaponifiables such as sterols, feeding the mixture into a thin film evaporator equipped with a rake, separating the unsaponifiable matter including sterols and water from the soaps by evaporation, chemically decomposing the resultant soaps into fatty acids and rosin acids by the use of mineral acids, and then refining those acids by distillation.

Figure 2:
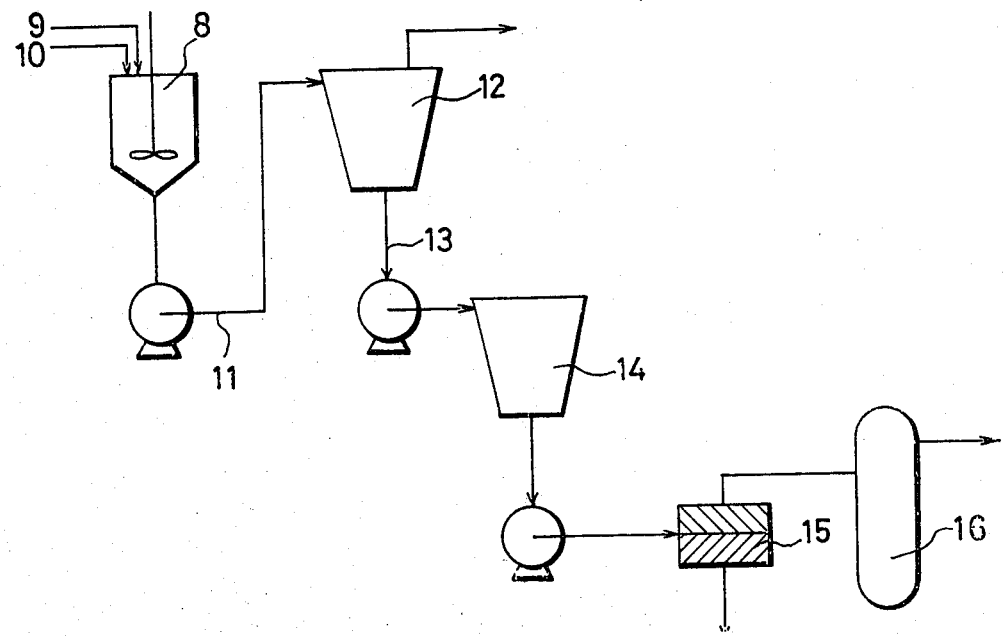

Other objects and advantages of the invention will become apparent from the following description taken in connection with the accompanying drawing wherein:

FIG. 1 is a flow sheet of the process according to the invention wherein the material to be treated is the head; and FIG. 2 is a flow sheet of the process wherein the material is the pitch or its mixture with the head.

In the process of the invention, it is important at first to obtain high purity soaps. The soaps obtained by saponification of the tall oil head and/or pitch are the soap composed chiefly of highly unsaturated oleic acid, linolic acid, and linolenic acid, and the soap composed of rosin acids. These soaps are thermally very unstable. In order to improve the purity of these soaps, it is necessary to remove even the high-boiling matter and, therefore, to use high temperatures. This involves rather excessive decomposition and coloring due to the decomposition to heat and the long holding time at elevated temperature, as is usually the case with ordinary distillation. For this reason, in the present invention, a thin film evaporator is employed instead of resorting to the conventional means of distillation. The evaporator is suited for recovering high purity soaps of fatty acids and rosin acids, because the material flowing along tube walls in the vessel is spread to thin films and is rapidly evaporated by the heating of the tube walls.

The thin film evaporator equipped with a rake has a clearance, ranging from substantially zero to about three millimeters, between the blade tips in the vessel and the surrounding wall, the choice of the clearance dimension depending upon the intended use of the evaporator.

The tall oil pitch and head being treated in accordance with the present invention will give unsaponifiables including low-boiling matter and also the water and alcohol used for the saponification. Since the evaporation temperature of these unsaponifiables is considerably lower than the melting temperature of the soaps, the temperatures in the vicinity of the upper portion and the inlet of the rake type thin film evaporator are necessarily so low during operation that the soaps will not melt and not flow down by gravity. If a rake type thin film evaporator having a larger clearance is used for the treatment, the soaps will not melt and will deposit solidly on the heating surfaces. Only partly dehydrated, they will form thin films with added viscosity and will scarcely flow down, making it impossible for the evaporator to carry out its purpose. In addition, the evaporator with a large clearance cannot achieve the purpose of reducing the material's contact time with the heating surfaces to a minimum, an important requirement for the successful evaporation of the thermally instable material which has to be treated at above the melting temperature of the soaps.

On the other hand, the thin film evaporator having a very narrow clearance or equipped with the blade in contact with the surrounding wall can force down or scrape off the soapy deposits not hot enough for melting from the heating surfaces (i.e., tube walls) by means of the blade. In this way the soaps are fluidized and melted by thorough heat transfer with a uniformly shortened period of time for contact with the heating surfaces. The deposits thus melt down while separating the unsaponifiable matter out of the soaps. It then follows that the purpose of the invention is accomplished by the use of a rake type thin film evaporator in which the clearance between the blade tips and the tube wall is narrow or the blade is in contact with the wall. The clearance is desirably not more than 1 mm, preferably not more than 0.5 mm.

It should be noted that the clearance specified above is not essential after the soapy desposits under their melting point have been melted down from the vicinity of the upper portion and inlet of the thin film evaporator. The blade for the evaporator may be any of the known types, i.e., the rigid type, the wiper type with a flexible shaft and blade, or the type having a flexible blade only, provided that it gives a clearance of not more than 1 mm.

A preferred embodiment (I) of the invention wherein the material to be treated is the head of tall oil distilled is represented by the flow sheet in FIG. 1. As shown, the head is introduced into a saponifier 1 through line 2, and an aqueous alkali solution in an amount equal to or more than the saponification equivalent is added through line 3. This aqueous alkali solution is desirably a solution of 10 to 50 wt.% sodium hydroxide in water. It is added in an amount equal to the saponification equivalent or to the excess by 20 %. The mixture is forcibly agitated at between a room temperature and 200°C, preferably between 60° and 150°C, and under pressure of more than the atmospheric, preferably between the atmospheric and the gage pressure of 3 kg/cm$^2$, for several minutes to several hours until complete saponification is accomplished. The saponified head is fed via line 4 to a rake type thin film evaporator 5 having a clearance of not more than 1 mm between the blade tips and the tube wall. In the vessel the charge is treated at the lowest possible pressure, preferably between 50 and 10 mmHg, and at a temperature higher than the melting point of the soaps, preferably between the melting point and the melting point plus 50°C. Unsaponifiable matter and water are removed, leaving molten soaps behind. If the treatment is accomplished at below the melting point of the soaps, only partial dehydration of the soaps will take place and the unsaponifiable matter will not be fully removed. The unsaponifiables are mostly diterpenes and triterpenes, which are useful because, by substantially polymerization, they will yield good terpene resins. While the molten soaps may be directly cooled to form solid soaps of value for industrial applications, it is further treated in accordance with the present invention. With the addition of water, and of steam where necessary, the molten soaps are decomposed in the usual manner into fatty acids, and fatty acids are recovered by a separator 6. If necessary, the fatty acids are further rectified by a distiller 7 to recover high purity fatty acids.

In another embodiment (II) where the pitch is treated, the charge is handled in the manner illustrated by the flow sheet in FIG. 2. A saponifier 8 is supplied with the pitch via line 9 and with an aqueous alkali solution in an amount equal to or more than the saponification equivalent via line 10. The aqueous alkali solution is desirably a solution of 10 to 50 wt.% sodium hydroxide in water, and preferably the solution is added in an amount equal to the saponification equivalent or to the excess by 20 %. When the saponification finds some difficulty, alkyl alcohol having from 1 to 6 carbon atoms in the molecule is added, and the decomposition is effected until the esters are thoroughly decomposed with forced agitation at a temperature not high enough for the decomposition of the useful components, that is, between a room temperature and 250°C, preferably between 80° and 200°C, and at a pressure below the atmospheric, preferably between the atmospheric and the gage pressure of 15 kg/cm$^2$, for several minutes to several hours. The saponified pitch is fed via line 11 to a rake type thin film evaporator 12 having a clearance of not more than 1 mm between the blade tips and the tube wall. The charge is treated at a pressure as reduced as feasible, say between 50 and 10 mmHg, and at a temperature higher than the melting point of the soaps containing heavy unsaponifiables, preferably between the melting point and the melting point plus 50°C. In this way light unsaponifiables and water are eliminated. Where an alcohol was added during the saponification, it is removed, too. After the removal of the water, alcohol, and light unsaponifiable matter, the remainder is fed through line 13 to a second-stage thin film evaporator 14 equipped with a rake. Here the charge is treated under the temperature and pressure conditions necessary for removing at least the β-sitosterol content, that is, at a reduced pressure lower than that in the first-stage evaporator 12, preferably at less than 5 mmHg, and at a temperature higher than the melting point of the soaps, desirably between the melting point and 320° C. Industrially useful unsaponifiable matter containing β-sitosterol in a high concentration is thus recovered, and molten soaps are obtained. With the addition of water, and of steam where necessary, the soaps thus obtained are decomposed into acids by the known method. A mixture of rosin acids and fatty acids is recovered by a separator 15. If necessary, the mixture may be rectified by a distillation equipment 16, so that the oxy-acids and polymers in the pitch which are largely responsible for the coloration of the products can be separated as heavy components, and high purity fatty acids and rosin can be recovered.

In still another embodiment (III) of the invention where the material to be treated is a mixture of the pitch and the head, the treatment is carried out in the same way as with the pitch (II) to recover fatty acids and rosin with high degrees of purity.

According to the process of the invention, the head and/or the pitch of tall oil distilled is treated without the use of a solvent but by means of a rake type thin film evaporator or evaporators having a clearance of not more than 1 mm between the blade tips and the tube wall, and fatty acids and rosin acids are thereby recovered in high yields and with high degrees of purity. Industrially valuable sterols can also be recovered in concentrated forms. Further, a fraction composed largely of terpenes is recovered so that the terpenes upon subsequent polymerization can give good terpene resins. Thus, the invention renders it possible to obtain high purity fatty acids, rosin acids, terpenes and β-sitosterol in high yields through a very inexpensive and simplified process. The tall oil pitch and head which are mostly consumed as fuels today contain rosin acids and fatty acids, and the process of the invention is of advantage in recovering from the rather unimportant secondary products such acids which are industrially valuable but have in recent years been in short supply throughout the world.

The invention is illustrated by the following examples.

EXAMPLE 1

To 10 kg of a tall oil head having an acid value of 130 and a saponification value of 139 was added 3.5 kg of an aqueous solution of 30 wt.% sodium hydroxide. The mixture was saponified in a 50-liter pressure autoclave equipped with an agitator at a temperature of 110°C and at a pressure of 1.3 kg/cm$^2$ for 20 minutes. The saponified charge was transferred to a vertical thin film evaporator equipped with a rake and having a heating surface area of 0.1 m$^2$, and a clearance of 0.5 mm between the blade tips and the surrounding wall, and was treated at a flow rate of 15 kg/Hr with a blade speed of 1,000 RPM and under the conditions of 235°C and 20 mmHg. The treatment gave a red oily product having a terpene-like smell and containing 7.8 kg/Hr of soaps and 5.7 kg/Hr of water. The soaps were decomposed with sulfuric acid, and the resulting fatty acids were distilled to obtain 6.9 kg of a yellowish tall oil fatty acid having an acid value of 191 and a saponification value of 194. By way of comparison, the same saponification products as given above were treated by a rake type thin film evaporator having a larger clearance of 1.5 mm. The procedure and results were as follows.

REFERENTIAL EXAMPLE 1

Under the same conditions as used in Example 1 a tall oil head was saponified. The products were treated in the exactly same way as in the preceding example within a rake type thin film evaporator having a heating surface area of 0.1 m$^2$ and a clearance between the blade and the heating surface of 1.5 mm, at a flow rate of 15 kg/Hr. Following the treatment, water emerged from the top portion of the vessel but no soap flowed out of the bottom portion. The experiment was suspended and the evaporator was disassembled, when it was found that dehydrated, highly viscous soap deposits had packed at the space between the upper heating surface and the blade tips.

EXAMPLE 2

To 10 kg of a tall oil pitch having an acid value of 45 and a saponification value of 105 were added 2.4 kg of an aqueous solution of 30 wt.% sodium hydroxide and 10 liters of butanol. The mixture was saponified in a 50-liter pressure autoclave equipped with an agitator under the conditions of 180°C and 4.5 kg/cm$^2$ for 50 minutes. The saponified material was treated in a thin film evaporator having a heating surface area of 0.1 m$^2$ and a clearance of substantially zero, meaning that the blade tips in sliding contact with the surrounding wall, at a flow rate of 18 kg/Hr and a blade speed of 1,000 RPM, under the conditions of 225°C and 17 mmHg. From the bottom portion of the evaporator, 10.5 kg of soaps containing unsaponifiables were obtained and from the top portion, 10.1 kg of an oil containing large proportions of butanol and water. The soaps were further treated in a rake type thin film evaporator having a heating surface area of 0.1 m$^2$ and a clearance of 0.8 mm at a flow rate of 11 kg/Hr and a blade speed of 1,000 RPM under the conditions of 275°C and 2 mmHg. 5.4 kg/Hr of soaps came out of the bottom portion of the vessel and 5.1 kg/Hr of a tarry oil containing 17.5 wt.% of sterol came out of the top portion. The soaps were decomposed with sulfuric acid, and the resulting rosin and fatty acids upon distillation yielded 3.9 kg of a yellow tall oil fatty acid having an acid value of 178 and a saponification value of 183. The product contained 75 % rosin acids and 23 % fatty acids.

REFERENTIAL EXAMPLE 2

Under the same conditions as used in Example 1 a tall oil head was saponified. The products were treated in the exactly same way as in the preceding example within a rake type thin film evaporator having a heating surface area of 0.1 m$^2$ and a clearance between the blade and the heating surface of 1.2 mm, at a flow rate of 10 kg/Hr. Following the treatment, 2.6 kg/Hr of water containing a red oil having a terpene-like smell emerged from the top portion of the vessel, and 6.9 kg/Hr of soap melted partly flowed out of the bottom portion. The soaps were decomposed with sulfuric acid, and the resulting fatty acids were distilled to obtain 9.5 kg/Hr of a blackish-red tall oil fatty acid having an acid value of 147 and a saponification value of 149.

The resulting tall oil fatty acid was not improved in quality, and the result of refining process was dissatisfaction.

EXAMPLE 3

Under the same conditions as in Example 1 excepting that the treating temperature in the rake type thin film evaporator was modified, tall oil heads were treated. Tall oil fatty acids of the properties as tabulated below resulted.

| Exp. No. | Treating temp. | Property of recovered tall oil fatty acid | | |
|---|---|---|---|---|
| | | Acid value | Saponification value | Color |
| 3 | 260°C | 189 | 192 | Yellow |
| 4 | 300°C | 182 | 186 | Yellowish red |

The melting temperature of the soaps was 213°C.

What is claimed is:

1. A process for recovering fatty acids and/or rosin acids which comprises the steps of saponifying a tall oil head and/or pitch, introducing the saponified material into a thin film evaporator equipped with a rake and having a clearance of not more than one millimeter between the blade tips and the surrounding tube wall, evaporating and removing the low-boiling matter including unsaponifiables by a treatment at a temperature not lower than the melting point of the resulting soaps, and thereafter decomposing the saponification products.

2. A process according to claim 1, wherein the rake type thin film evaporator has a blade tip-wall clearance of from substantially zero to 0.8 mm.

3. A process according to claim 1, wherein the soaps are treated in the rake type thin film evaporator under reduced pressure and at a temperature between the melting point of the soaps and a temperature higher than the melting point by 50°C.

4. In recovering fatty acid and rosin acid from tall oil pitch or a mixture of tall oil pitch and head, a method which comprises the steps of saponifying the pitch or the mixture of pitch and head in the presence or absence of alcohol, then introducing the resulting product into a first rake type thin film evaporator having a clearance of less than 1 mm between the blade tips and the tube wall, and treating it at a temperature not lower than the melting point of soap under reduced pressure so that the light unsaponified material and water part as well as the added alcohol, in case of need, can be removed, then introducing the resulting product thus treated into a second rake type thin film evaporator having a clearance of less than 1 mm between the blade tips and the tube wall, and treating it at a temperature not lower than the melting point of soap under reduced pressure lower than that of said first step so that the unsaponified heavy material can be removed and finally decomposing the saponified material thus obtained.

* * * * *